July 2, 1940.  J. B. MacKENZIE  2,206,745
STOKER AND DRIVE MECHANISM THEREFOR
Filed May 17, 1938   5 Sheets-Sheet 1
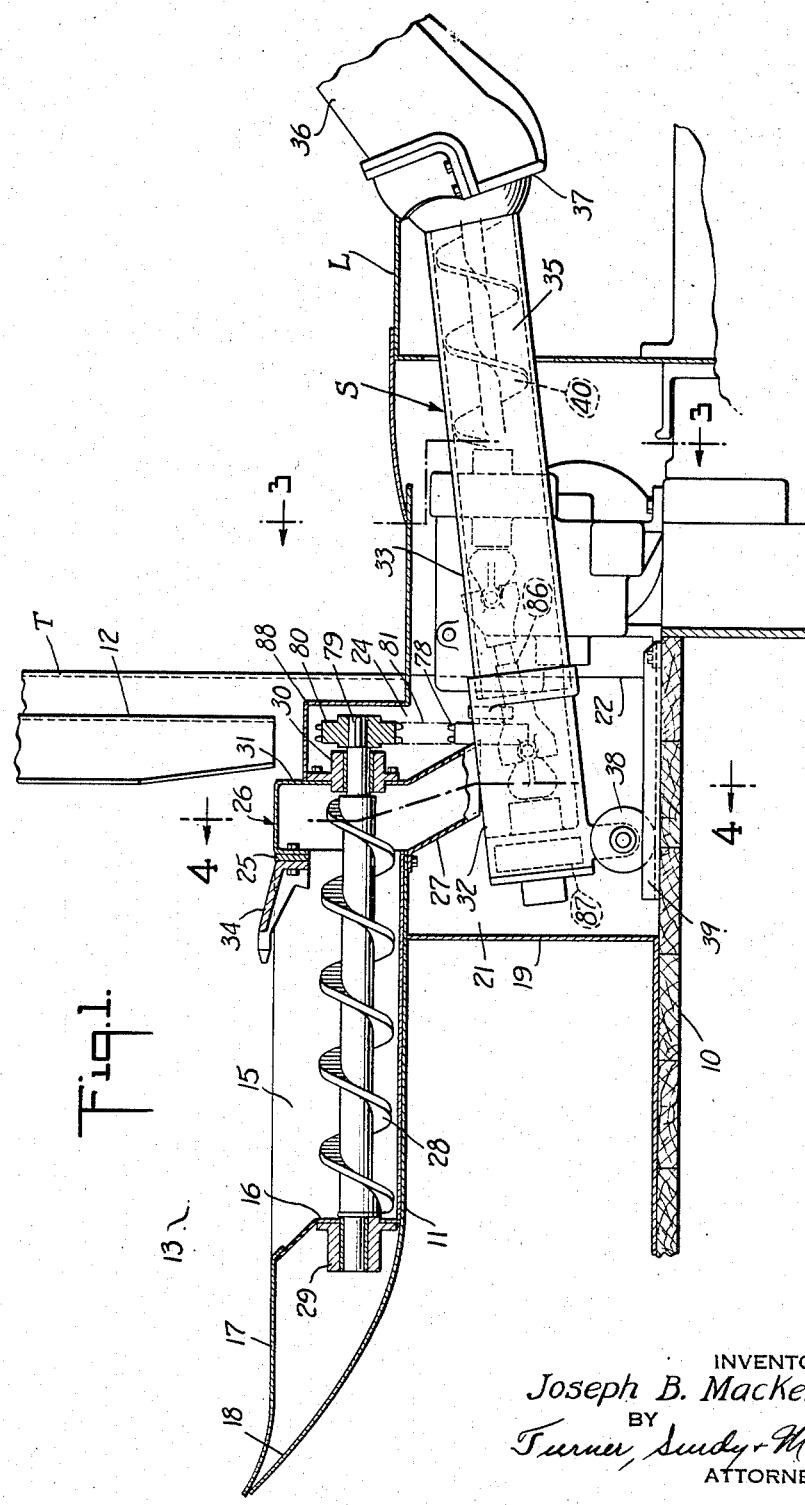
INVENTOR
Joseph B. MacKenzie
BY
Turner, Sundy & Moeller
ATTORNEYS July 2, 1940. J. B. MacKENZIE 2,206,745
STOKER AND DRIVE MECHANISM THEREFOR
Filed May 17, 1938 5 Sheets-Sheet 2
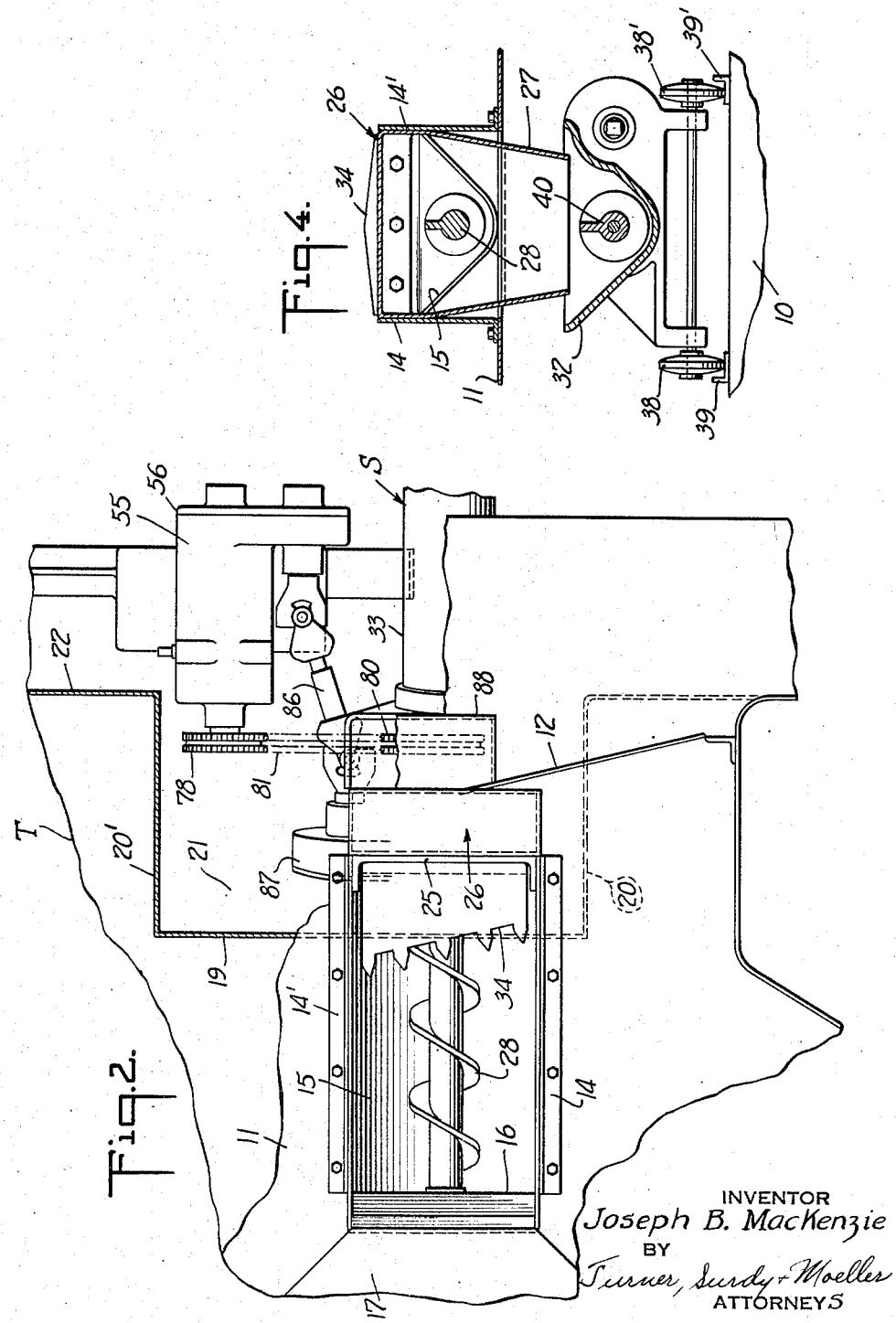
INVENTOR
Joseph B. MacKenzie
BY
Turner, Surdy & Moeller
ATTORNEYS July 2, 1940.  J. B. MacKENZIE  2,206,745
STOKER AND DRIVE MECHANISM THEREFOR
Filed May 17, 1938  5 Sheets-Sheet 3
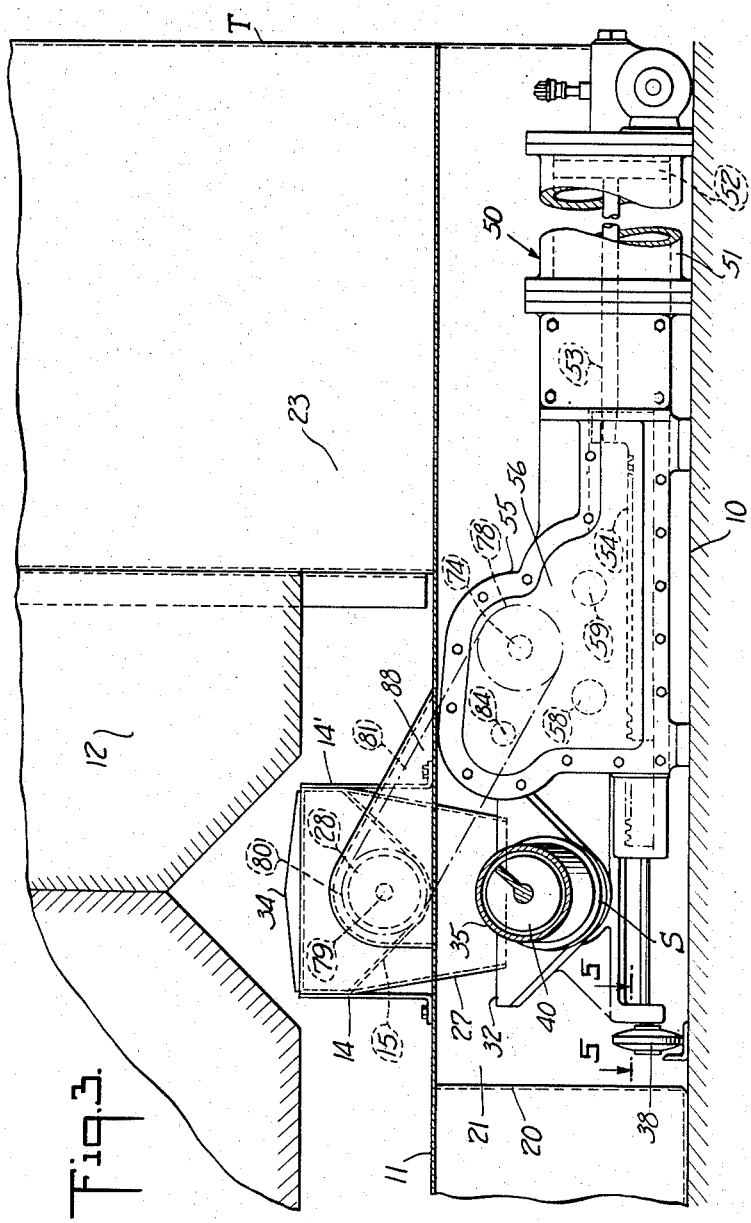
INVENTOR
Joseph B. MacKenzie
BY
Turner, Sundy & Moeller
ATTORNEYS

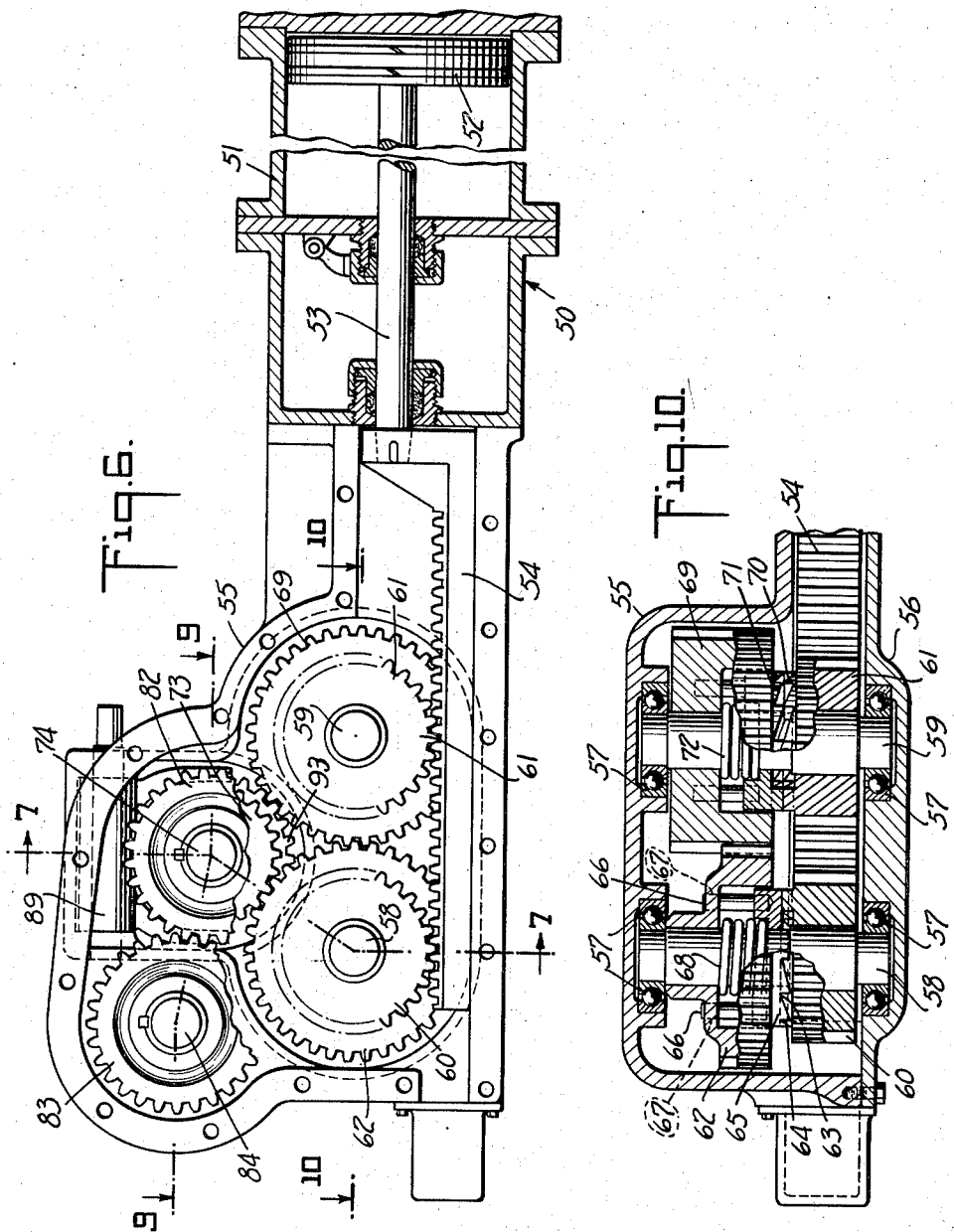

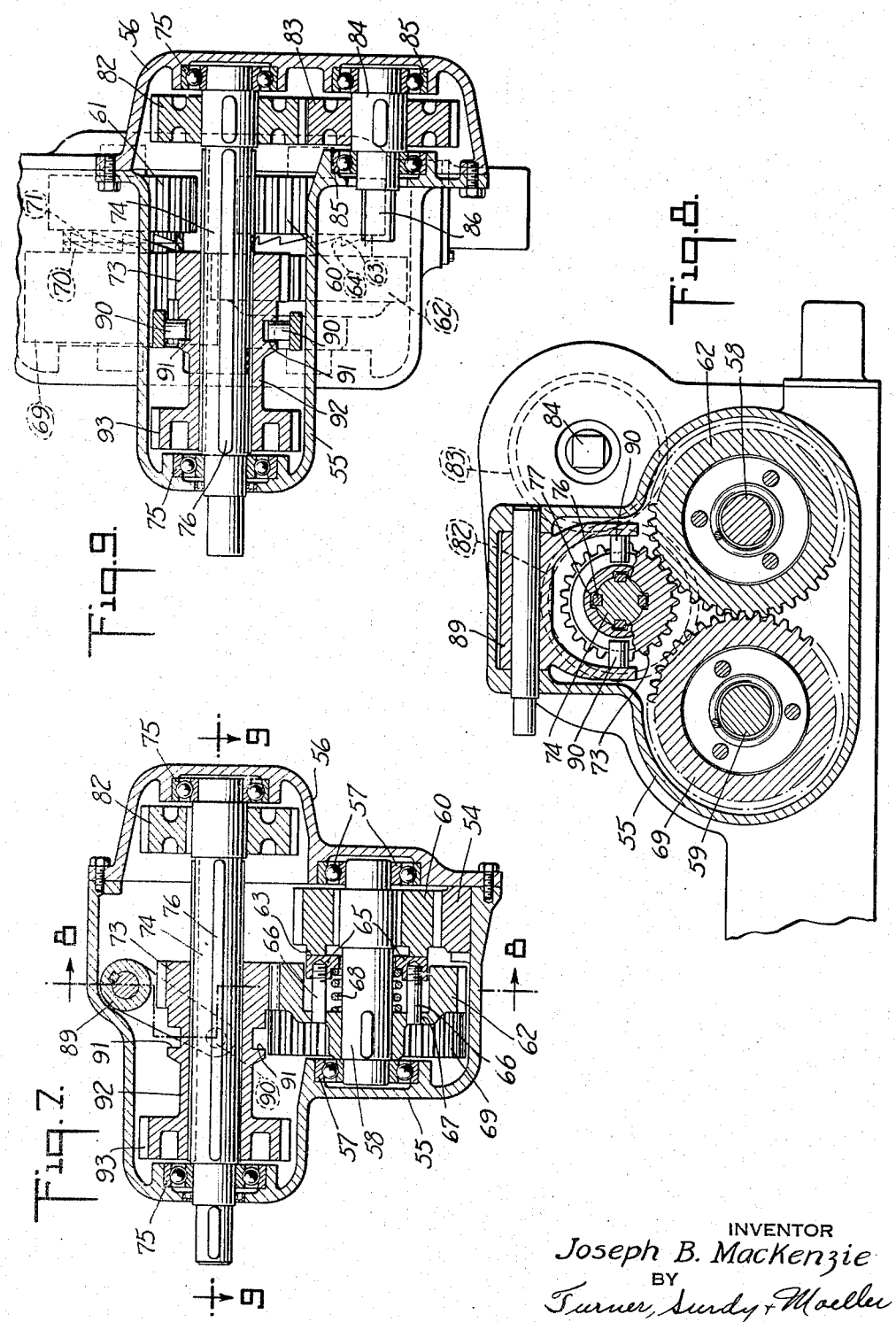

Patented July 2, 1940

2,206,745

UNITED STATES PATENT OFFICE

2,206,745

STOKER AND DRIVE MECHANISM THEREFOR

Joseph B. MacKenzie, Eaglehurst, Erie, Pa., assignor to The Standard Stoker Company, Incorporated, a corporation of Delaware Application May 17, 1938, Serial No. 208,379

6 Claims. (Cl. 74—131)

This invention relates generally to mechanical stokers and more particularly to power transmitting means therefor.

An object of the invention is the provision in stokers having reciprocating power drive mechanism, of transmission mechanism for transforming the reciprocating motion of the drive means into continuous unidirectional rotary movement.

Another object of the invention is the provision in transmission mechanism of the character described of means for readily reversing the direction of the resulting unidirectional rotary motion.

Another object of the invention is the provision of transmission mechanism of the character described that is simple in design, compact in construction, efficient in operation and so arranged with the stoker and the tender of a locomotive as to be readily accessible for purposes of replacement or repair.

Another object of the invention is the provision in a locomotive tender of a stoker mechanism cheaply and readily installed and arranged to occupy a small portion only of the space ordinarily provided for coal and water storage.

With above and other objects in view, the invention consists in the features of construction, the combination of elements and arrangement of parts hereinafter more fully described and claimed, and illustrated in the accompanying drawings, in which Fig. 1 is a vertical central longitudinal section through adjacent portions of a locomotive and tender with the stoker and drive mechanism applied thereon and shown partly in section and partly in elevation;

Fig. 2 is a fragmentary sectional plan view through the tender showing the stoker and driving means therefor, parts being broken away;

Fig. 3 is a fragmentary sectional view taken on the line 3—3 of Fig. 1;

Fig. 4 is a fragmentary sectional view taken on the line 4—4 of Fig. 1;

Fig. 5 is a sectional view taken on the line 5—5 of Fig. 3;

Fig. 6 is a view of the driving mechanism, with the prime mover shown in section and the transmission shown in elevation, with the transmission casing cover removed;

Fig. 7 is a sectional view taken on the irregular line 7—7 of Fig. 6;

Fig. 8 is a sectional view taken on the irregular line 8—8 of Fig. 7;

Fig. 9 is a sectional view taken on the irregular line 9—9 of Fig. 7; and

Fig. 10 is a sectional view taken on the line 10—10 of Fig. 6.

In the drawings, referring particularly to Figures 1 to 5, an intercoupled locomotive and tender are designated generally by the letters L and T, respectively, with the novel stoker S applied thereto. The tender T comprises a frame 10 and a floor or deck 11 spaced above the frame 10. The portion of the tender deck 11 rearward of the coal gate 12 forms a floor for the fuel bin 13.

In the fuel bin 13 and secured in any suitable manner to the fuel bin floor are a pair of longitudinally extending spaced upstanding plates 14 and 14'. Mounted on the bin floor between the plates 14, 14' is an open mouth trough 15 having an upstanding rear wall 16 and an open forward end. A filler plate 17, extending forwardly from the rear slope sheet 18 of the fuel bin 13 to the rear wall 16 of the trough 15, is preferably provided.

A cross wall 19 and the longitudinally extending walls 20, 20' form a compartment 21 disposed centrally at the forward end of the tender between the frame 10 and the deck 11 and opening through the tender front wall 22. The tender deck 11 is provided at the forward end of the fuel bin 13 and between the bulkheads 23 with an opening 24 communicating with the compartment 21.

The trough 15 is provided with a plate 25 extending transversely across the upper forward ends of the trough side walls, to which is secured a casing 26. The lower portion of the casing 26 extends through the opening 24 in the tender deck into the compartment 21 and is in the form of a chute 27.

A screw conveyor 28 is disposed in the trough 15, the rearward end thereof being journaled in a bearing 29 secured to the trough rear wall 16 beneath the filler plate 17. The forward end of the screw conveyor 28 extends into the casing 26 and is journaled in a bearing 30 secured to the front wall 31 of the casing 26. Fuel is conveyed forwardly through the trough 15 and casing 26 by the screw conveyor 28 and then drops by gravity through the chute 27 into the trough-like rearward portion 32 of the conduit 33. A crusher member 34 arching over the screw conveyor 28 is secured to the rear side of the plate 25 and in conjunction with the screw conveyor 28 crushes the fuel to a suitable size for firing.

The forward portion of the conduit 33 is in the form of a tubular member 35 extending upwardly and forwardly from the tender to the locomotive. Any suitable type of discharge conduit 36, universally connected, as at 37, to the forward end of the tubular member 35, may be employed for the delivery of the fuel to the locomotive firebox (not shown).

The rearward end of the conduit 33 is provided with rollers 38, 38' mounted in the guides 39, 39' extending longitudinally and secured to the frame 10 in the compartment 21. The rollers 38, 38' provide for relative longitudinal movement between the conduit 33 and the tender when relative longitudinal movement between the tender and locomotive occurs. A screw conveyor 40 advances fuel through the conduit 33 to the discharge conduit 36.

The screw conveyors 28 and 40 are driven from their forward and rearward ends respectively, by means which will be described in detail. The motive power is a single cylinder reciprocating steam engine 50, and transmission mechanism, to be described, is provided for rotating the screw conveyors 28 and 40 continuously in forward or reverse direction.

The engine 50 is mounted on the frame 10 at the forward end of the tender and at one side of the conduit 33. The engine comprises a cylinder 51 housing a piston 52 which is reciprocable therein to operate a piston rod 53. Secured to the piston rod 53 is a rack gear 54 mounted to reciprocate in a housing 55 provided with a removable cover 56. Mounted in roller bearings 57 in the housing 55 and cover 56 are a pair of horizontally alined spaced parallel shafts 58 and 59 extending transversely of and above the rack gear 54. A gear 60 is loosely mounted on the shaft 58 and is in constant mesh with the rack gear 54. A second gear 61 is loosely mounted on the shaft 59 and is also in constant mesh with the rack gear 54.

On the forward stroke of the rack gear 54, the gear 60 is rotated in a clockwise direction and turns the gear 62, which is loosely mounted on the shaft 58, in the same direction by means of the engaging clutch teeth 63 and 64 provided on the adjacent faces of the gears 60 and 62, respectively. The clutch teeth 64 are formed on a clutch member 65 which is arranged for movement longitudinally of the axis of the gear 62, by means of the pins 66 threaded at one end in the clutch member 65 and fitting loosely at their other ends in the openings 67 extending through the gear 62. A coil spring 68 urges the clutch member 65 away from the gear 62 and maintains the clutch teeth 63 and 64 in engagement.

The gear 61 is also rotated in a clockwise direction by the rack gear 54 on its forward stroke. The gear 62 is in constant mesh with a gear 69 loosely mounted on the shaft 59, thus turning the gear 69 in a counterclockwise direction. The gears 61 and 69 are provided with clutch teeth 70 and 71, respectively, formed to act oppositely to the clutch teeth 63 and 64, respectively, so that on the forward stroke of the rack gear 54, the clutch teeth 70 and 71 will ride over each other against the pressure of the spring 72, disengaging the gears 61 and 69.

On the back stroke of the rack gear 54, the gear 61 is rotated in a counterclockwise direction and turns the gear 69 in a similar direction through engagement of the clutch teeth 70, 71. The gear 62 is in constant mesh with the gear 69 and is turned in a clockwise direction. Clockwise rotation of the gear 62 causes the clutch teeth 64 to ride over the clutch teeth 63 of the gear 60, which, on the backstroke of the rack gear 54, is rotated in a counterclockwise direction.

Thus on both the forward and back stroke of the rack gear 54, the gear 62 is caused to rotate in a clockwise direction. The gear 62 is arranged to engage a gear 73 mounted on a shaft 74 journaled in roller bearings 75 in the casing 55 and cover 56. The gear 73 is arranged for slidable movement axially along the shaft 74 by means of keys and keyways 76 and 77, respectively, and causes rotation of the shaft 74 in a counterclockwise direction.

The shaft 74 extends rearwardly through the housing 55 and has a sprocket wheel 78 mounted thereon exterior of the housing 55. The screw conveyor 28 is provided with a projecting shaft portion 79 extending forward of the bearing 30 and has mounted thereon a sprocket wheel 80. A sprocket chain 81 passes over the sprockets 78 and 80 for operating the screw conveyor 28 from the engine 50. A casing 88 houses the sprocket 80 and that portion of the sprocket chain 81 that travels above the level of the tender deck 11.

A gear 82 keyed on the forward end of the shaft 74 within the casing 55 meshes with a gear 83 keyed on a shaft 84 journaled in roller bearings 85. An extensible shaft 86 is universally connected at one end with the shaft 84 and at its other end with the gearing 87 at the rearward end of the conduit 33 for driving the screw conveyor 40. From the foregoing description it will be seen that the screw conveyors 28 and 40 are arranged to be driven continuously in one direction by separate shafts operatively connected through the described transmission and rack gear 54 with the reciprocating engine 50.

At times, as when a clog occurs in the conveying mechanism, it is necessary to reverse the direction of rotation of the screw conveyors. For this purpose a shifter yoke 89 is pivotally mounted in the casing 55. The yoke 89 is provided with inwardly extending lugs 90 engaging a groove 91 extending circumferentially of the sleeve portion 92 of the gear 73. Referring particularly to Fig. 7, it will be seen that movement of the yoke 89 in a counterclockwise direction about its pivot will shift the gear 73 to the right out of engagement with the clockwise rotating gear 62 and effects engagement of gear 93 with the counterclockwise rotating gear 69, thus reversing the direction of rotation of shaft 74, to which the gear 93 is splined. Changing the direction of rotation of shaft 74 effects reversal of rotation of screw conveyor 28 and also effects reversal of rotation of screw conveyor 40 through meshed gears 82 and 83 and shaft 84.

From the above description it will be apparent that the stoker conveyor screws can be operated continuously in either forward or reverse direction from the reciprocating engine 50.

I claim:

1. Means to transform a reciprocating driving motion into a continuous unidirectional motion comprising an ultimate driving shaft, a gear mounted on said shaft, a reciprocating rack gear, a pair of spaced shafts, a driving gear loosely mounted on each of said spaced shafts, said driving gears being in constant driving relation with said rack gear, a driven gear loosely mounted on each of said spaced shafts, said driven gears being in constant driving relation, the driving and driven gear on one of said spaced shafts and the driving and driven gear on the other of said spaced shafts being provided with separate oppositely acting overrunning clutch means, one of said driven gears being in driving relation with the gear on said ultimate driving shaft.

2. Means to transform a reciprocating driving motion into a continuous unidirectional motion comprising an ultimate driving shaft, a gear mounted on said shaft, a reciprocating rack gear, a pair of spaced shafts, a driving gear loosely mounted on each of said spaced shafts, said driving gears being in constant mesh with said rack gear, a driven gear loosely mounted on each of said spaced shafts, said driven gears being in constant mesh, the driving and driven gear on one of said spaced shafts and the driving and driven gear on the other of said spaced shafts being provided with separate oppositely acting overrunning clutch means, one of said driven gears meshing with the gear on said ultimate driving shaft.

3. Means to transform a reciprocating driving motion into a continuous unidirectional motion comprising a pair of ultimate driving shafts, a gear mounted on one of said ultimate driving shafts, a reciprocating rack gear, a pair of spaced shafts, a driving gear loosely mounted on each of said spaced shafts, said driving gears being in constant driving relation with said rack gear, a driven gear loosely mounted on each of said spaced shafts, said driven gears being in constant driving relation, the driving and driven gear on one of said spaced shafts and the driving and driven gear on the other of said spaced shafts being provided with separate oppositely acting overrunning clutch means, one of said driven gears being in driving relation with the gear on the said one of said ultimate driving shafts, and gearing operatively connecting said last named ultimate driving shaft with the other of said ultimate driving shafts.

4. Means to transform a reciprocating driving motion into a continuous unidirectional motion comprising an ultimate driving shaft, a reciprocating rack gear, a pair of spaced shafts, a driving gear loosely mounted on each of said spaced shafts, said driving gears being in constant mesh with said rack gear, a driven gear loosely mounted on each of said spaced shafts, said driven gears being in constant driving relation, the driving and driven gear on one of said spaced shafts and the driving and driven gear on the other of said spaced shafts being provided with separate oppositely acting overrunning clutch means, a pair of gears slidably keyed on said ultimate driving shaft for movement axially therealong, and means for moving one of said last named gears into driving relation with one of said driven gears for turning said ultimate driving shaft in one direction and for moving the other of said last named gears into driving relation with the other of said driven gears for turning said ultimate driving shaft in the opposite direction.

5. Means to transform a reciprocating driving motion into a continuous unidirectional motion comprising an ultimate driving shaft, a reciprocating rack gear, a pair of spaced shafts, a driving gear loosely mounted on each of said spaced shafts, said driving gears being in constant driving relation with said rack gear, a driven gear loosely mounted on each of said shafts, said driven gears being in constant driving relation, the driving and driven gear on one of said spaced shafts and the driving and driven gear on the other of said spaced shafts being provided with separate oppositely acting overrunning clutch means, and means on said ultimate driving shaft arranged for selective engagement with one or the other of said driven gears for continuously operating said ultimate driving shaft in a clockwise or counterclockwise direction.

6. Means to transform a reciprocating driving motion into a continuous unidirectional motion comprising an ultimate driving shaft, a reciprocating gear, a pair of spaced shafts, a driving gear loosely mounted on each of said spaced shafts, said driving gears being in constant driving relation with said rack gear, a driven gear loosely mounted on each of said spaced shafts, said driven gears being in constant driving relation, the driving and driven gear on one of said spaced shafts and the driving and driven gear on the other of said spaced shafts being provided with separate oppositely acting overrunning clutch members, the clutch member of one of the gears on each of said spaced shafts being mounted with its respective gear for rotation therewith and for limited axial movement with respect thereto and yieldable means for urging said axially movable clutch members against the other of said clutch members, one of said driven gears being in driving relation with the gear on said ultimate driving shaft.

JOSEPH B. MacKENZIE.